United States Patent
Cavitt et al.

(10) Patent No.: US 11,720,732 B2
(45) Date of Patent: Aug. 8, 2023

(54) DETERMINING A BLENDED TIMING CONSTRAINT THAT SATISFIES MULTIPLE TIMING CONSTRAINTS AND USER-SELECTED SPECIFICATIONS

(71) Applicant: International Business Machines Corporation, Armonk, NY (US)

(72) Inventors: Chris Aaron Cavitt, Poughkeepsie, NY (US); Brandon Albert Bruen, Wappingers Falls, NY (US); Eric Foreman, Fairfax, VT (US); Jesse Peter Surprise, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 17/402,739

(22) Filed: Aug. 16, 2021

(65) Prior Publication Data

US 2023/0047911 A1     Feb. 16, 2023

(51) Int. Cl.
| | |
|---|---|
| *G06F 30/30* | (2020.01) |
| *G06F 30/3315* | (2020.01) |
| *G06F 30/347* | (2020.01) |
| *G06F 30/398* | (2020.01) |
| *G06F 119/12* | (2020.01) |

(52) U.S. Cl.
CPC ........ *G06F 30/3315* (2020.01); *G06F 30/347* (2020.01); *G06F 30/398* (2020.01); *G06F 2119/12* (2020.01)

(58) Field of Classification Search
None
See application file for complete search history.

(56) References Cited

U.S. PATENT DOCUMENTS

| | | | |
|---|---|---|---|
| 7,231,627 B2 | 6/2007 | Fong et al. | |
| 7,418,686 B1* | 8/2008 | Knol | G06F 30/392 |
| | | | 716/118 |
| 8,448,113 B2 | 5/2013 | Amundson et al. | |
| 8,813,011 B2* | 8/2014 | Bhardwaj | G06F 30/3312 |
| | | | 716/108 |
| 9,342,639 B1 | 5/2016 | Casey et al. | |
| 9,971,861 B2* | 5/2018 | Behnen | G06F 30/39 |
| 10,423,742 B2* | 9/2019 | Wu | G06F 30/3312 |

(Continued)

OTHER PUBLICATIONS

Dutta et al., "Assertion-based flow monitoring of SystemC models." 2014 Twelfth ACM/IEEE Conference on Formal Methods and Models for Codesign (MEMOCODE). IEEE. 2014. 10 pages.

(Continued)

*Primary Examiner* — Leigh M Garbowski
(74) *Attorney, Agent, or Firm* — Cantor Colburn LLP; Kelsey M. Skodje

(57) ABSTRACT

Embodiments of the invention are directed to a computer-implemented method of determining timing constraints of a first component-under-design (CUD). The computer-implemented method includes accessing, using a processor, a plurality of timing constraint requirements configured to be placed on the first CUD by one or more second CUDs, wherein each of the plurality of timing constraint requirements is specifically designed for the CUD. The processor is used to perform a comparative analysis of each of the plurality of timing constraints to identify a single timing constraint that satisfies each of the plurality of timing constraints.

20 Claims, 12 Drawing Sheets

(56) References Cited

U.S. PATENT DOCUMENTS

| | | | |
|---|---|---|---|
| 10,467,365 B1* | 11/2019 | Kulshreshtha | G06F 30/3312 |
| 10,489,534 B1 | 11/2019 | Ramabadran | |
| 10,572,613 B2 | 2/2020 | Geva et al. | |
| 10,657,211 B2 | 5/2020 | Plotkin et al. | |
| 10,706,194 B2 | 7/2020 | Suess et al. | |
| 10,831,958 B2* | 11/2020 | Geva | G06F 30/3312 |
| 10,885,249 B1* | 1/2021 | Kollesar | G06F 30/392 |
| 11,003,821 B1* | 5/2021 | Pothukuchi | G06F 30/333 |
| 11,030,304 B2 | 6/2021 | Gauthier et al. | |
| 11,144,694 B2* | 10/2021 | Srimal | G06F 30/39 |
| 2011/0083114 A1 | 4/2011 | Chetput et al. | |
| 2013/0159952 A1* | 6/2013 | Niu | G06F 30/3323 |
| | | | 716/113 |
| 2016/0179503 A1 | 6/2016 | Bates et al. | |
| 2017/0357742 A1 | 12/2017 | Darbari et al. | |
| 2020/0081693 A1 | 3/2020 | Moussa et al. | |

OTHER PUBLICATIONS

Dutta et al., "CHIMP: a tool for assertion-based dynamic verification of systemc models." Program Proceedings (2013): 38-45.

Mukhopadhyay et al., "Instrumenting AMS assertion verification on commercial platforms." ACM Transactions on Design Automation of Electronic Systems (TODAES) 14.2 (2009): 1-47.

Sanyal et al., "Recurrence in Dense-time AMS Assertions." IEEE Transactions on Computer-Aided Design of Integrated Circuits and Systems. 2020. pp. 1-7.

Uchevler et al., "Modelling and assertion-based verification of run-time reconfigurable designs using functional programming abstractions." International Journal of Reconfigurable Computing, vol. 2018, Article ID 3276159. 2018. 25 pages.

* cited by examiner

DETERMINING A BLENDED TIMING CONSTRAINT THAT SATISFIES MULTIPLE TIMING CONSTRAINTS AND USER-SELECTED SPECIFICATIONS

BACKGROUND

The present invention relates in general to integrated circuits used in programmable computers. More specifically, the present invention relates to computing systems, computer-implemented methods, and computer program products that implement an integrated circuit design technique configured and arranged to determine or generate a blended or merged timing constraint that satisfies multiple timing constraints and multiple user-selected specifications.

Static timing analysis (STA) is a step in the overall design of high-speed very large scale integrated (VLSI) circuits. STA is used to verify that a VLSI circuit-design performs correctly at a required frequency before it is released for chip manufacturing. The layout of an integrated circuit (IC) must not only satisfy geometric requirements but must also meet the design's timing requirements and constraints. The optimization process that meets timing requirements and constraints is often called timing closure. Timing closure procedures design and optimize a circuit such that applied electrical signals can traverse through the circuit within the specified timing constraints. A circuit-design must achieve timing closure prior to manufacturing. STA techniques are used to guide and validate the completion of timing closure.

In known STA techniques, a circuit-design is represented as a timing graph. The points in the design where timing information is desired constitute the nodes or timing points of this graph, while electrical or logic connections between these nodes are represented as timing arcs of the graph. STA is performed typically at the logic gate level using lookup-table based gate timing libraries and involves some runtime expensive circuit simulation for timing calculation of wires and gates using current source model based timing libraries.

SUMMARY

Embodiments of the invention are directed to a computer-implemented method of analyzing timing constraints of a first component-under-design (CUD). The computer-implemented method includes accessing, using a processor, a plurality of timing constraint requirements configured to be placed on the first CUD by one or more second CUDs, wherein each of the plurality of timing constraint requirements is specifically designed for the first CUD. The processor is used to perform a comparative analysis of each of the plurality of timing constraints to identify a single timing constraint that satisfies each of the plurality of timing constraints.

Embodiments of the invention are also directed to computer systems and computer program products having substantially the same features, technical effects, and technical benefits as the computer-implemented methods described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
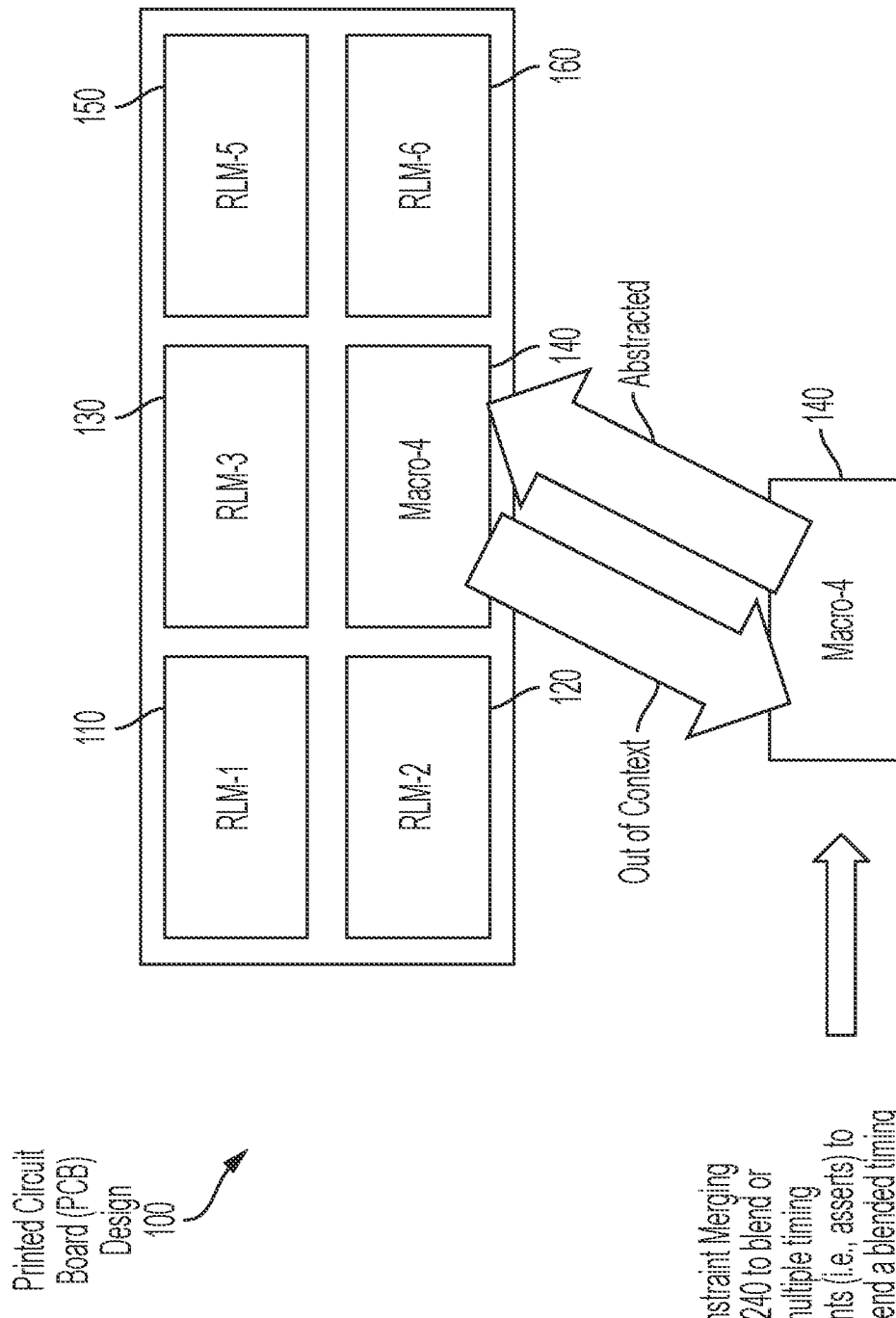
FIG. 1 depicts a block diagram illustrating an integrated circuit design having multiple sub-circuits to which embodiments of the invention can be applied.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, function as the module and achieve the stated purpose for the module.

Many of the functional units of the systems described in this specification have been labeled as models. Embodiments of the invention apply to a wide variety of model implementations. For example, the models described herein can be implemented as machine learning algorithms and natural language processing algorithms configured and arranged to uncover unknown relationships between data/information and generate a model that applies the uncovered relationship to new data/information in order to perform an assigned task of the model.

The various components/modules/models of the systems illustrated herein are depicted separately for ease of illustration and explanation. In embodiments of the invention, the functions performed by the various components/modules/models can be distributed differently than shown without departing from the scope of the various embodiments of the invention describe herein unless it is specifically stated otherwise.

Turning now to an overview of technologies that are relevant to embodiment of the invention, the terms "static timing analysis" (STA) describe techniques and systems that model various sub-circuitry of an integrated circuit (IC) design at pre-manufacturing stages (e.g., during a floorplanning stage) to ensure that the IC design(s) can run at the design-required timing frequencies. In STA, the terms "arrival time" and equivalents thereof refer to estimates of the time at which data transmitted in accordance with the IC design actually arrives at its target location. The terms "required arrival time" and equivalents thereof refer to the time at which data is required by the IC design to arrive at its target location. The term "slack" and equivalents thereof are used to identify the difference between "required arrival time" and "arrival time." Negative slack (arrival time>required arrive time) means that data arrives too soon and can be lost or can result in delays while the system performs data error correction. Positive slack (arrival time<required arrival time) within an acceptable range means data will arrive on time. Positive slack that is outside an acceptable range (arrival time significantly<required arrival time) means data will arrive too soon and can be lost or result in delays while the system performs data error correction. Negative slack, as well as positive slack outside of an acceptable range, require corrective IC design changes such as additional circuit buffers, rearranged wiring, and the like.

Because modern chip manufacturing technology is scaling to sub-45 nanometers, VLSI designs are increasingly larger in terms of size and complexity. Application specific integrated circuit (ASIC) designs contain several to a few hundred million logic gates. Performance centric designs, especially microprocessor designs, include custom-designed circuit components to achieve aggressive frequency targets and can contain upwards of one billion transistors. STA performed for these designs would ideally employ circuit simulators for obtaining accurate timing calculations. However, the run-time intensive nature of circuit simulation is impractical for large designs, especially where timing runs are made daily during the design cycle of the chip. In essence, performing STA on modern large circuits as a single flattened design is run-time prohibitive. This has led to the development of a hierarchical timing flow where a circuit design is partitioned into components. A component can be partitioned further into sub-components in a recursive fashion. As an example, a typical microprocessor design is partitioned into several components called cores, each core is partitioned into components termed units, and each unit is partitioned into components termed microchips or macros. Illustratively, a core level of hierarchy can contain a set of units connected using wires and additional gates that may or may not be part of any component. Similarly, a unit level of hierarchy can contain a set of macros connected using wires and additional gates that may or may not be part of any component. For ease of notation, the term "component" will be used in this detailed description to refer to a sub-component or component (e.g. a macro, a unit, or a core).

A printed circuit board (PCB) houses components, and each component has input/output (I/O) lines that transmit and receive data under the coordination of various clock signals. Clock signals are generated by a circuit's clock generation and distribution systems that are designed to control how the clock signals impose various timing requirements dictated by the relevant circuit design(s). In general, clock signals are used to coordinate the actions of two or more circuits, including, for example, coordinating data transmissions between one component and another component. In instances where there is a hierarchical relationship between the components, the component that sets the requirements (e.g., timing requirements or constraints) for another component is known as the "parent," and the component that has its requirements (e.g., timing requirements or constraints) set by another component is known as the "child." The clock signal oscillates between a high and a low state with a selected duty cycle (e.g., a 50% duty cycle) and is usually a square wave. The clock signal effectively defines when a component performs an operation or instruction. A clock cycle can be defined as the high-low-high transition of the clock signal, and the various operations or functions performed under control of the clock signal can be evaluated in terms of the number of clock cycles the operation or function takes to complete. For example, a child component can take one clock cycle to move data from the child component to one of its parent components, but a different child component can take two clock cycles to perform the same operation.

In known STA techniques, a component can be removed from its context within the IC design, and the component's timing requirements are modeled, out of context, to determine whether the component's current design can meet the timing requirements, and to determine whether corrective design changes to the component (or other portions of the IC) are required in order to meet the timing requirements. However, it is a priority in IC designs to re-use as many components as possible, which means that a given component is often deployed at multiple locations throughout the IC. The multiple locations can be within the same chip of the IC or across multiple different chips of the IC. Thus, a re-used component can be a child component to multiple different parent components, which means that the child components will need to satisfy multiple, potentially competing timing constraints that come from multiple different parent components. Known STA techniques do not provide comprehensive computer-implemented analysis techniques that assist with determining the appropriate timing constraint for a child component that needs to satisfy multiple, potentially competing timing constraints applied to the child component by multiple different parent components.

Turning now to an overview of aspects of the invention, embodiments of the invention provide computing systems, computer-implemented methods, and computer program products that implement an integrated circuit design technique configured and arranged to blend or merge multiple parent-level timing constraints placed on a child component to determine or identify a blended timing constraint that satisfies the multiple parent-level timing constraints placed on the child component. In aspects of the invention, a component-under-design (the child component) is removed from the context of its overall IC design, and the multiple different and potentially competing parent-level timing constraints that need to be satisfied by the component-under-design are accessed. In embodiments of the invention, each parent-level timing constraint is set based on the specific timing requirements of the corresponding parent component, and a given parent-level timing constraint may or may not be different from the other parent-level timing constraints that will be applied to the component-under-design. In some embodiments of the invention, the parent-level timing constraints are developed for each pin of the component-under-design. In some embodiment of the invention, user specifications are developed for each pin of the component-under-design, and the user specifications apply additional constraints or requirements on the parent-level timing constraints. As an example, the user specification could be a function set by a designer that requires, for example, a selection of a largest one of the multiple parent-level timing constraint. In another example, the user specification could be a function set by the designer that requires, for example, a selection of a largest one of the multiple parent-level timing constraints but only if condition "X" occurs. A constraint merging module is configured to, in accordance with aspects of the invention, perform a computer-implemented blending or merging process that blends or merges the multiple parent-level timing constraints and/or the user specifications by analyzing the multiple parent-level timing constraints and/or the user specifications to identify or generate a single blended/merged parent-level timing constraint that can satisfy all of the multiple parent-level timing constraints and/or user specifications.

In embodiments of the invention, the blending or merging process performed by the constraint merging module can be a computer-implemented process that includes determining common attributes of the plurality of timing constraints and/or the user specifications, wherein the common attributes include attributes that are present in each of the plurality of timing constraints and/or the user specifications; determining unique attributes among the plurality of timing constraints and/or the user specifications, wherein the unique attributes include attributes that are present in some but not all of the plurality of timing constraints and/or the user specifications; determining maximum and minimum values of the common attributes; determining maximum and minimum values of the unique attributes; and outputting as the merged/blended timing constraint a timing constraint that satisfies the maximum and minimum values of the common attributes, as well as the maximum and minimum values of the unique attributes. In embodiments of the invention, the blending/merging process is a modular algorithm, which allows it to easily interface with a wide variety of types of timing constraints as well as a wide variety of types of user specifications.

As an example of a blending/merging process in accordance with embodiments of the invention, a multi-pin component-under-evaluation is removed from the context of its parent-level component (or components) for asynchronous design away from the design activities of the parent-level component. Because the component-under-design will be reused at different locations of the overall IC design, it is determined that the component-under-design's parent-level components will impose multiple different sets of timing constraints (A, B, C) on the various pins of the component-under-design. Prior to performing STA on the component-under-design, the blending/merging process is applied to each pin of the component-under-design in order to determine a single timing constraint for each pin that satisfies all of the parent-level timing constraint sets that will be placed on the pin. A first iteration of the blending/merging process begins by selecting a first pin of the component-under-design then evaluating reference values of the selected pin against threshold values to make an initial evaluation of whether or not blending/merging operations are needed for this pin. In embodiments of the invention, the reference value can be slack values selected from the sets of timing constraints (A, B, C), and the threshold values for the slack values can be taken the previously-described user specifications developed for each pin of the component-under-design. A comparison of the slack values against the slack value thresholds is useful here because if the slacks are very positive, it is likely that the resource used to perform the blending/merging operations can be conserved by not performing the blending/merging operation and selecting one of the reference sets as the timing constraint that satisfies all of the different sets of timing constraints for that pin. In other words, it is unlikely that there will be timing issues across run types if they are all passing very positive slacks. If the slack values are not within the slack value thresholds, and if the selected pin is identified as one of the pins to be evaluated, the blending merging process for that pin is performed by looking at the early and late, rise and fall "arrival times" for A, B, and C. The blending/merging process takes the minimum of early (rise/fall) arrival times from A, B and C; and takes the maximum of late (rise/fall) arrival times from A, B, and C. This single set of arrival times (early/late/rise/fall) for the selected pin is determined to be the final blended/merged timing constraint set and will be used in-context in the parent-level.

The constraint merging module can be incorporated within a constraint management system (CMS) that applies the single blended/merges timing constraint to the component-under-design to provide feedback to an overall STA system on the ability of the component-under-design to meet the single blended/merged timing constraint, which can be used by the STA system as feedback on whether the component-under-design can meet all of the multiple parent-level timing constraints and/or the user specifications. In some embodiments of the invention, the constraint merging module selects one of the multiple parent-level timing constraints as the blended/merged timing constraint based on having determined that the selected parent-level timing constraint will satisfy all of the multiple parent-level timing constraints and/or all of the user specifications. In some embodiments of the invention, the constraint merging module determines that no single parent-level timing constraint is satisfactory or optimal for satisfying the multiple parent-level timing constraints and/or the user specifications and instead determines that some type of combination of the multiple parent-level timing constraints is appropriate. For example, where the per pin parent-level timing constraints are each a single timing value (e.g., data signal A will arrive at Pin-1 in 212 picoseconds), the constraint merging module can determine or recommend that the single blended/merged timing constraint that will satisfy the multiple parent-level timing constraints and/or the user specifications is an average of each of the timing values from each of the multiple parent-level timing constraints.

Embodiments of the invention provide technical effects and benefits, including, for example, that embodiments of the invention do not require the execution of timing simulations or the physical implementation of the component-under-design. Additionally, aspects of the invention do not look backward over time to estimate convergence of timing constraints. Aspects of the invention also, beneficially, do not compare parent-level timing constraints back against a timing model. The constraint merging module in accordance with embodiments of the invention uses a modular blending/merging function, which means that the blending/merging function is highly flexible and configured to incorporate any arbitrary set of parent-level timing constraints and any type of user specification into its merging/blending process/function then, for each pin, execute the modular blending/merging processes/function to determine what timing constraint value to pick across all of the multiple parent-level timing constraints identified for the component-under-design.

Turning now to a more detailed description of various embodiments of the invention, FIG. 1 depicts a block diagram illustrating a portion of a PCB design 100. To ensure that the PCB design 100 works as planned, a design team will use STA to determine whether or not the clocks and signals are correctly timed. The STA can be performed using flat or hierarchical techniques, mostly depending on the size of the overall PCB design. Flat analysis provides improves result accuracy because the analysis is completely transparent down to the logic cells. However, flat analysis requires more memory and a significant amount of time to run because every cell and every wire in the design is analyzed. Hierarchical analysis methods are appropriate for larger design sizes to help alleviate huge runtimes. Using a hierarchical approach, a designer selects and times certain blocks of logic (e.g., a component-under-design), thereby generating results more quickly and with fewer memory resources. These blocks are then modeled as timing abstractions at the top level of the design to reduce the overall amount of detailed analysis in the final stages. In general, hierarchical analysis minimizes the time to obtain results but with less accuracy than flat analysis. Although embodiments of the invention are described herein in the context of a hierarchical design approach, embodiments of the invention can be applied to a wide variety of types of STA techniques.

The PCB design 100 is depicted during a floorplanning stage of an overall IC design process. In electronic design automation, a floorplan of an IC is a schematic representation of tentative placement of its major functional blocks. In modern electronic design process, floorplans are created during the floorplanning design stage, which is an early stage in the hierarchical approach to IC design. Floorplanning tasks include determining cell placement, block sizes (e.g., for random logic macros (RLM)), and block routing overhead (e.g., signals, clocking, power). PCB design 100 depicts six (6) components, which are shown as RLM-1 110, RLM-2 120, RLM-3 130, Macro-4 140, RLM-5 150, and RLM-6 160. The combination of components shown in FIG. 1 are illustrative, and aspects of the invention can be applied to any combination of IC components.

Figure 10:
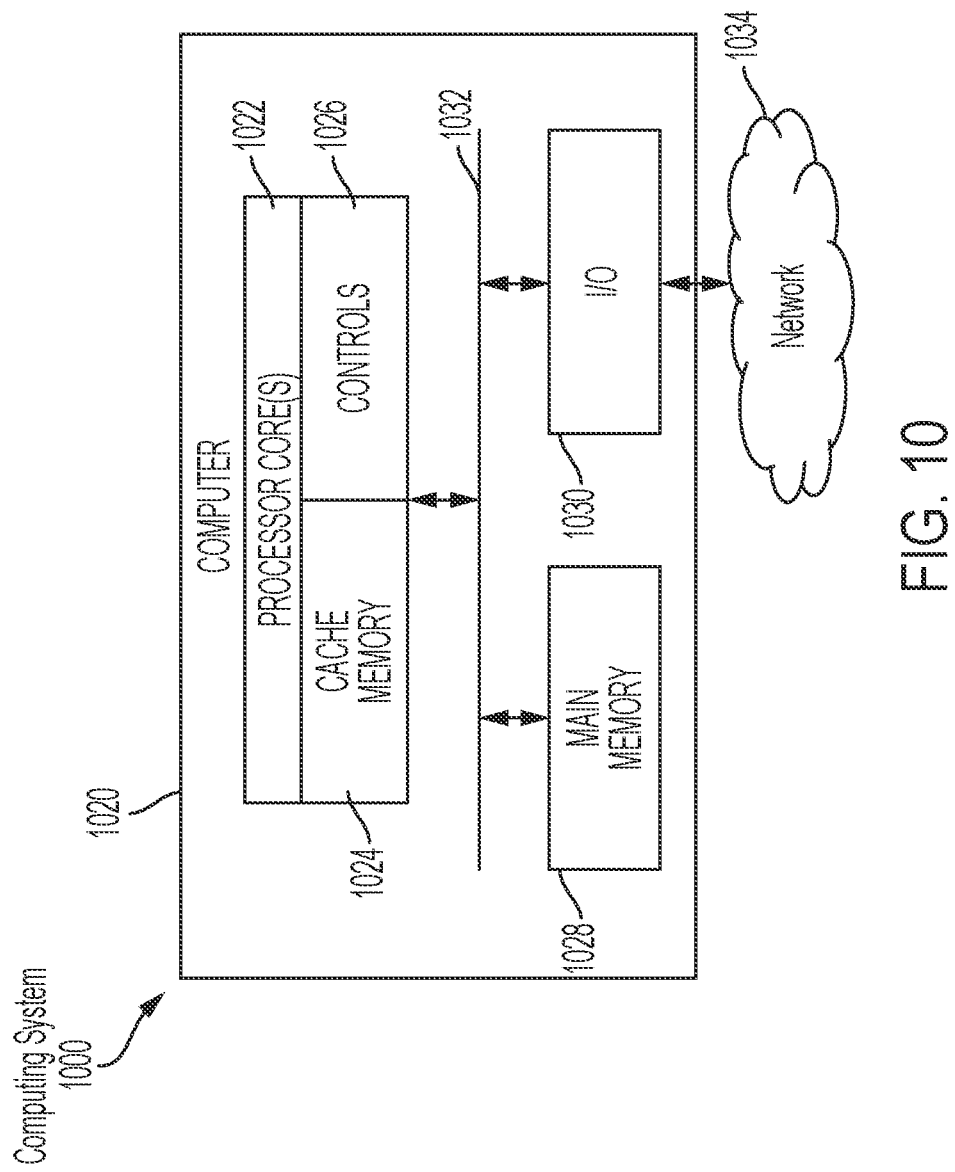
FIG. 10 depicts details of an exemplary computing system capable of implementing various aspects of the invention.

Various STA techniques are applied to the PCB design 100 using, for example, a programmable computing system such as programmable computer 1000 (shown in FIG. 10). In accordance with aspects of the invention, the performance of the STA techniques is improved by using a constraint merging module 240 (show in FIG. 2) to enhance the ability of the STA techniques to successfully set timing parameters of the components of the PCB design 100. In accordance with aspects of the invention, the constraint merging module 240 accesses various parent-level timing constraints (e.g., as shown in repository 410 shown in FIG. 4) and/or user specifications (e.g., as shown in repository 420 shown in FIG. 4) that have been set for the Macro-4 140 based on requirements of one or more components (e.g., RLM-1 110, RLM-2 120, RLM-3 130, RLM-5 150, RLM-6 160) of the PCB design 100. In accordance with embodiments of the invention, the constraint merging module 240 virtually removes the Macro-4 140 from the context of the PCB design 100, blends or merges the multiple parent-level timing constraints and/or user specifications to recommend a blended timing constraint for the Macro-4 140, and virtually returns the Macro-4 140 to the PCB design 100 for application of STA techniques that have been enhanced by the merged/blended timing constraints generated in accordance with embodiments of the invention.

Figure 2:
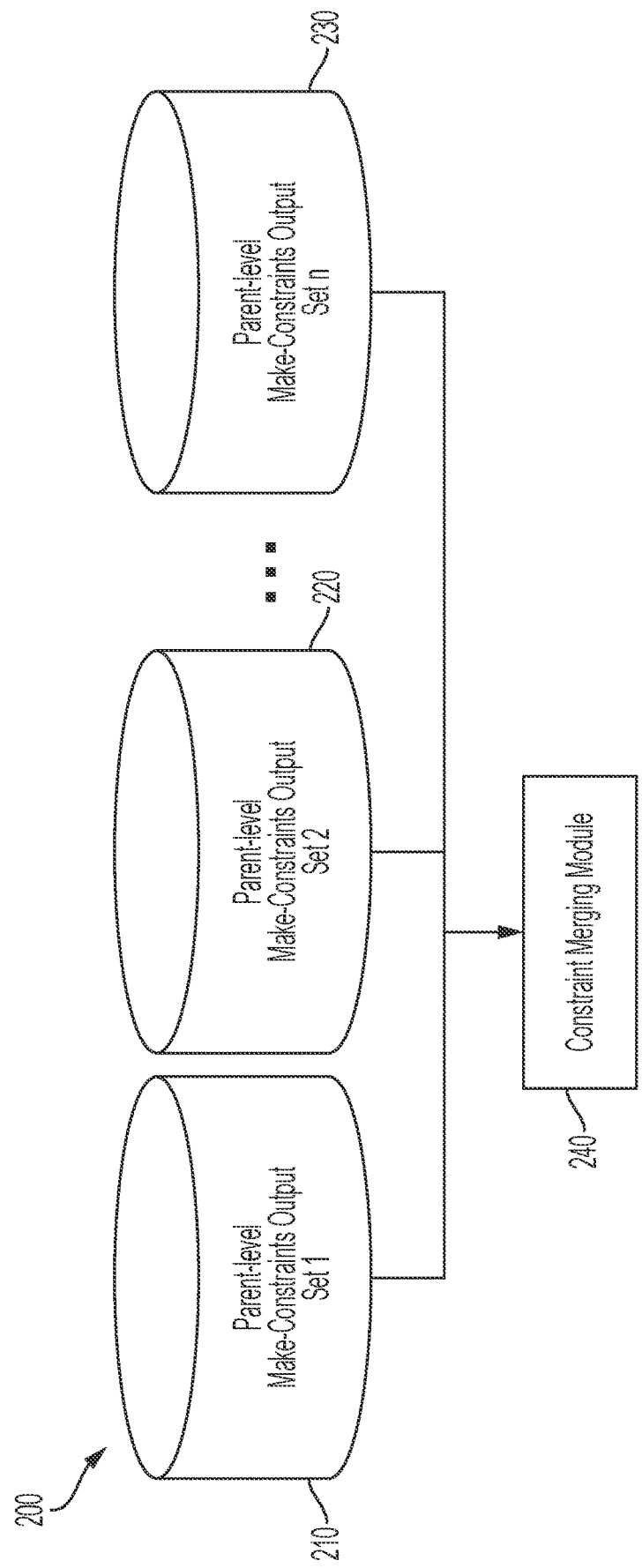
FIG. 2 depicts block diagram illustrating a system configured to implement embodiments of the invention.

FIG. 2 depicts a system 200 in accordance with aspects of the invention, wherein the constraint merging module 240 communicates with various repositories 210, 220, 230 configured and arranged to hold various sets of make-constraints outputs, which are essentially the parent-level timing constraints for the various components of the PCB design 100 (shown in FIG. 1). More specifically, the repositories 210, 220, 230 hold results of parent-level timing runs, which generate boundary assertions for each unique timing constraint definition within the parent-level repository. Each of the timing constraints is written to a single output directory. This group of timing constraints for all definitions of the specific parent-level run is considered a constraint set. In accordance with aspects of the invention, parent-level timing constraints are generated for each parent-level component then associated with the child component(s) (e.g., Macro-4 140) to which the parent-level timing constraint applies. The parent-level timing constraints and the association of the parent-level timing constraints with child components are stored in the repository in a manner that allows them to be searched and accessed by the constraint merging module 240 when needed.

Figure 3:
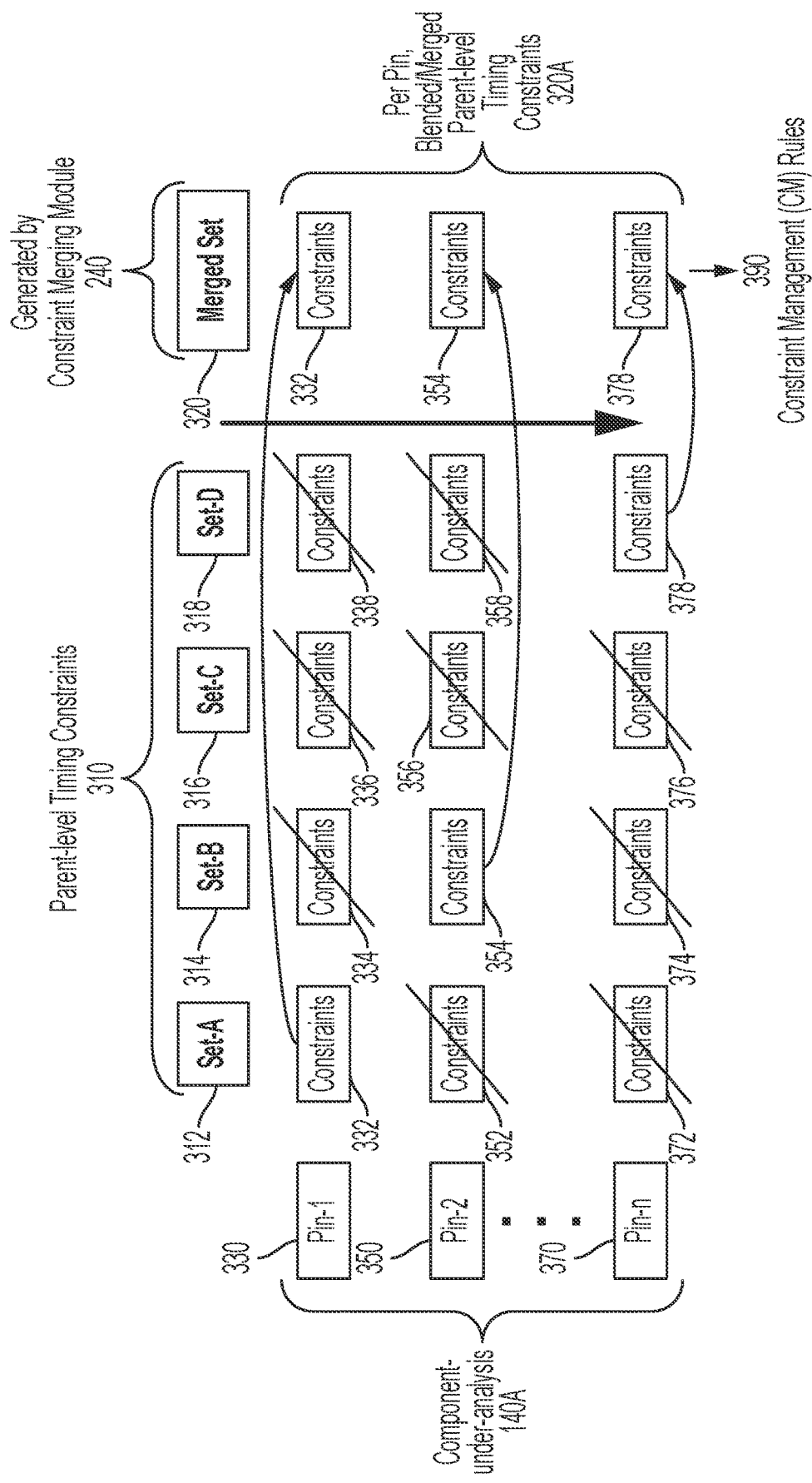
FIG. 3 depicts a block diagram illustrating the blending or merging of multiple timing constraints to recommend a blended or merged timing constraint in accordance with embodiments of the invention.

FIG. 3 depicts a conceptual diagram illustrating operations of the constraint merging module 240 in accordance with embodiments of the invention. A component-under-design 140A includes multiple pins Pin-1 330, Pin-2 350, extending up to Pin-n 370, where n is any whole number. Multiple sets of parent-level timing constraints 310, which are shown in FIG. 3 as Set-A 312, Set-B 314, Set-B 316, Set-D 318, have been associated with the pins of the components-under-design 140A stored in one of the data/information repositories 210, 220, 230 (shown in FIG. 2). Each individual set of parent-level timing constraints 310 includes constraints for each pin of the component-under design 140A. For pin-1 330, Set-A 312, Set-B 314, Set-B 316, and Set-D 318 apply constraints 332, 334, 336, 338 respectively. The constraint merging module 240 then analyzes the constraints 332, 334, 336, 338 in accordance with aspects of the invention and determines or predicts that constraint 332 should be selected and included in the merged set of constraints 320 because the constraint merging module 240 has determined or predicted that for pin-1 330 constraint 332 will satisfy the timing requirements for all of the constraints 332, 334, 336, 338. Similarly, for pin-2 350, Set-A 312, Set-B 314, Set-B 316, and Set-D 318 apply constraints 352, 354, 356, 358 respectively. The constraint merging module 240 then analyzes the constraints 352, 354, 356, 358 in accordance with aspects of the invention and determines or predicts that constraint 354 should be selected and included in the merged set of constraints 320 for pin-2 350 because the constraint merging module 240 has determined or predicted that constraint 354 will satisfy the timing requirements for all of the constraints 352, 354, 356, 358. Similarly, for pin-n 370, Set-A 312, Set-B 314, Set-B 316, and Set-D 318 apply constraints 372, 374, 376, 378 respectively. The constraint merging module 240 then analyzes the constraints 372, 374, 376, 378 in accordance with aspects of the invention and determines or predicts that constraint 378 should be selected and included in the merged set of constraints 320 for pin-n 370 because the constraint merging module 240 has determined or predicted that constraint 378 will satisfy the timing requirements for all of the constraints 372, 374, 376, 378. The constraint merging module 240 converts the merged sets 320 to a set of constraint management (CM) rules 390 that can be provided to a timing engine 440 (shown in FIG. 4) of an STA system (not shown separately) and used to performing improved STA techniques on the component-under-design 140A.

Figure 4:
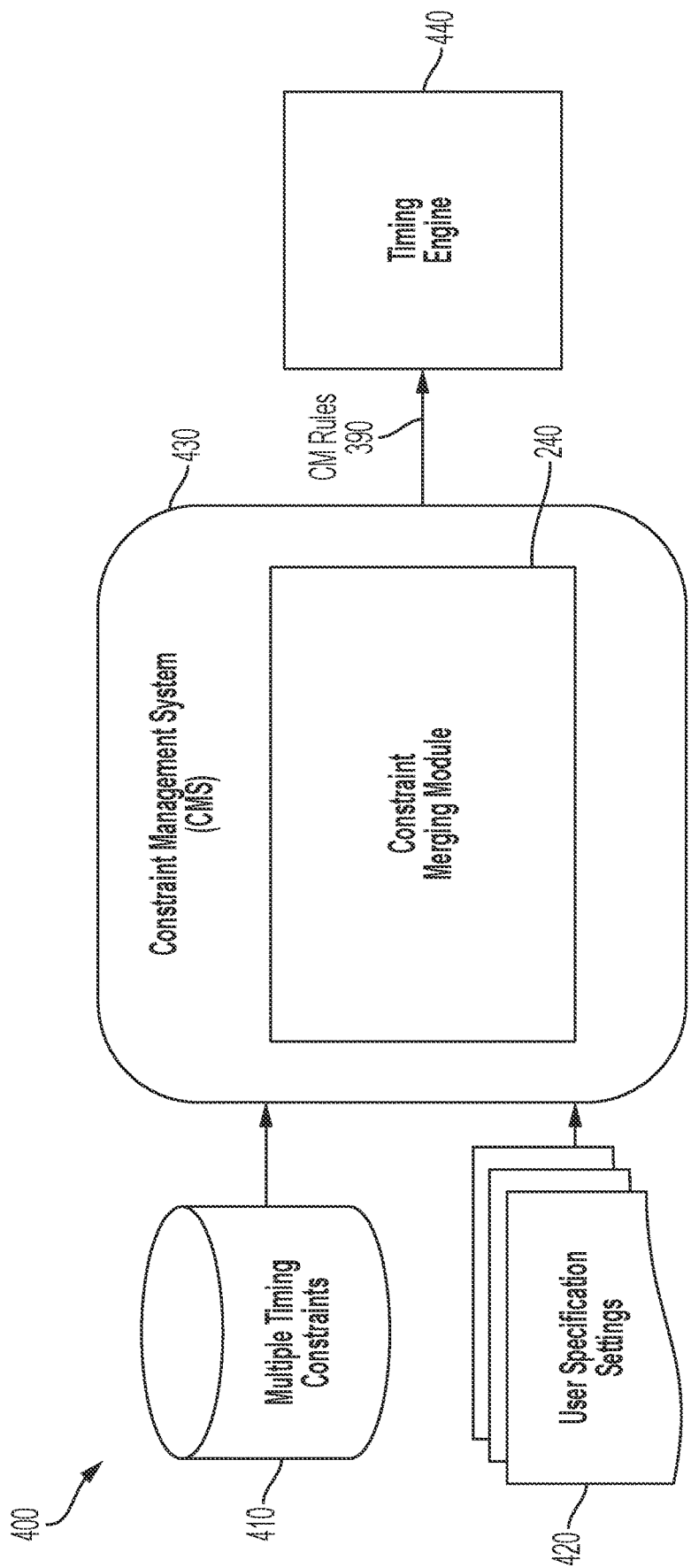
FIG. 4 depicts a block diagram illustrating a system in accordance with embodiments of the invention.

FIG. 4 depicts a system 400 capable of implementing aspects of the invention. The system 400 includes a constraint management system 430 communicatively couple to the timing engine 440 of an STA system (not shown separately). The constraint management system 430 includes the constraint merging module 240 configured to perform the operations depicted in FIG. 3 in accordance with aspects of the invention except that in FIG. 4 user specifications are also taken into account by the constraint merging module 240. The CMS 430 is configured to access multiple timing constraints from a multiple timing constraints repository 410, along with user specification settings from a user specification setting repository 420. The timing constraints can be expressed using a variety of timing parameters, including, for example, arrival time (AT), required arrival time (RAT), slack value, slew number, and the like. In general, every "state changing signal" has a stew number associated with it at any given point in time. The slew number is also referred to as "rise time and fall time." The user specifications (stored in repository 420) are options or control data that a designer or owner of the component-under-design (e.g., component-under-analysis 140A shown in FIG. 3) selects in order to provide the constraint merging module 240A with additional user-selected requirements/constraints (e.g., threshold values) on the multiple timing constraints (stored in repository 410). In some embodiment of the invention, user specifications are developed for each pin of the component-under-design. In embodiments of the invention, the user specification could be a function set by a designer that requires, for example, a selection of a largest one of the multiple parent-level timing constraints. In another example, the user specifications could be a function set by the designer that requires, for example, a selection of a largest one of the multiple parent-level timing constraints but only if condition "X" occurs. In some embodiments of the invention, the user specifications in repository 420 can also identify the location of the user-specific constraint merging module 240A (shown in FIG. 6), along with general timing run information (e.g., information that identifies the type of timing run to be performed. The CMS 430 accesses selected outputs (e.g., timing constraints and user specifications for the component-under-design 140A (shown in FIG. 3)) from the multiple timing constraints repository 410 and the user specification settings repository 420. The constraint merging module 240 then uses essentially the same process depicted in FIG. 3 except that both timing constraints and user specifications are utilized to generate the merged/blended timing constraint and the CM rules 390.

Figure 5:
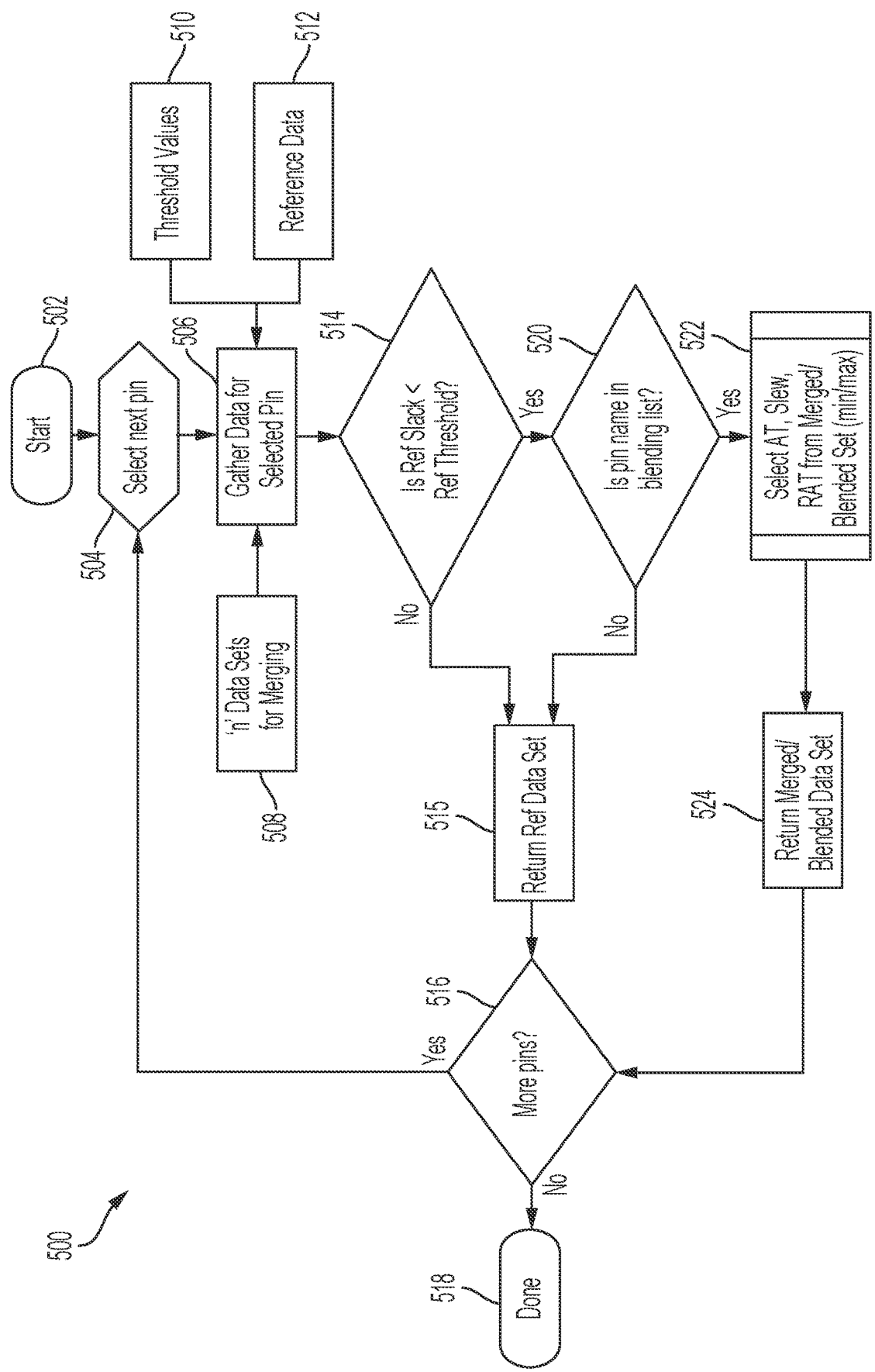
FIG. 5 depicts a flow diagram illustrating a method in accordance with embodiments of the invention.

FIG. 5 depicts a flow diagram illustrating a methodology 500 in accordance with aspects of the invention. The methodology 500 can be implemented by the constraint merging module 240 (shown in FIG. 4) and/or a constraint merging module 240A (shown in FIG. 6). More specifically, the methodology 500 can be implemented by a control file 610 of the constraint merging module 240A. The methodology 500 begins at start block 502 then moves to block 504 where a next pin of a component-under-design (or component-under-analysis) is selected. On a first iteration of the methodology 500, the pin selected at block 504 is an initial pin of the component-under-design. The methodology 500 then moves to block 506 where data is gathered for performing subsequent timing analysis of the selected pin. The data gathered includes "n" data sets for merging from block 506; threshold values from block 510; and reference data from block 512. The data sets at block 508 correspond to the multiple timing constraints at repository 410 (shown in FIG. 4), as well as the parent-level timing constraints 310 (shown in FIG. 3) for the selected pin (e.g., Pin-1 330 shown in FIG. 3) of the component-under-design. The threshold values at block 510 are user-specific comparison thresholds (e.g., slack threshold used at decision block 514) that are specifically set for the selected pin of the component-under-design by, for example, a designer of the component-under-design. The threshold values at block 510 corresponds to the user specification settings at repository 420. The reference data at block 512 is a reference base set of data for the selected pin of the component-under-design, wherein the reference base set of data is one of the "n" data sets (at block 508) that has been selected for use in the threshold comparison decision block 514. In accordance with aspects of the invention, the reference base set of data is the data from the "n" data set (block 508) that indicates that the blending/merging operations at block 522 are likely not necessary if the reference base data selected from block 512 is within the threshold values at block 510. As an example, decision block 514 uses slack values as the reference base data for comparison a slack value reference threshold value from the threshold values at block 510. Using slack values in decision block 514 is useful because if the slacks are very positive, it is likely that the resource used to perform the blending/merging operations at block 522 can be conserved. In other words, it is unlikely that there will be timing issues across run types if they are all passing very positive slacks. In some embodiments of the invention, different thresholds can be provided for different run types (e.g., NIOT or non-NIOT). In embodiments of the invention, other reference base data and corresponding threshold values can be used as long as the reference base data being within the corresponding threshold value indicates that the blending/merging operations at block 522 likely do not need to be performed.

The methodology 500 moves from block 506 to decision block 514 and determines whether or not a reference slack value for the selected pin is less than a reference threshold value for the selected pin. If the answer to the inquiry at decision block 514 is no, the methodology 500 determines that no blending operations are needed and moves to block 515 to return the reference data set, which will be used as the merged data set (e.g., merged set 320 shown in FIG. 3) for the selected pin. From block 515, the methodology 500 moves to decision block 516 and determines whether or not there are additional pins to be evaluated for the component-under-design. If the answer to the inquiry at decision block 516 is no, the methodology 500 moves to block 518 and ends. If the answer to the inquiry at decision block 516 is yes, the methodology 500 returns to block 504 and begins a new iteration of the methodology 500 for a next pin of the component-under-design.

Returning to the inquiry at decision block 514, if the answer to the inquiry at decision block 514 is yes, the methodology 500 moves to decision block 520 and evaluates whether or not the selected pin's name/type is in a blending list, which can be implemented as a list of net names, a netlist, or nets of interest. In electronic design, a netlist is a description of the connectivity of an electronic circuit. In its simplest form, a netlist includes a list of the electronic components in a circuit and a list of the nodes to which they are connected to. If the answer to the inquiry at decision block 520 is no, the methodology 500 determines that no blending operations are needed and moves to block 515 to return the reference data set, which will be used as the merged data set (e.g., merged set 320 shown in FIG. 3) for the selected pin. From block 515, the methodology 500 moves to decision block 516 and determines whether or not there are additional pins to be evaluated for the component-under-design. If the answer to the inquiry at decision block 516 is no, the methodology 500 moves to block 518 and ends. If the answer to the inquiry at decision block 516 is yes, the methodology 500 returns to block 504 and begins a new iteration of the methodology 500 for a next pin of the component-under-design.

Returning back to the inquiry at decision block 520, if the answer to the inquiry at decision block 520 is yes, the methodology 500 moves to block 522 and performs a blending/merging operation to identify a merged data set (e.g., merged set 320 shown in FIG. 3) for the selected pin. In accordance with embodiments of the invention, the blending/merging operations performed at block 522 generate a merged set (e.g., merged set 320 shown in FIG. 3) based on the "n" data sets and/or user specification settings (block 510) from the user specification setting repository 420 (shown in FIG. 4). In embodiments of the invention, block 522 performs a modular blending or merging process that includes determining common attributes of the "n" data sets and/or user specifications, wherein the common attributes include attributes that are present in each of the "n" data sets and/or the user specifications; determining unique attributes among the "n" data sets and/or the user specifications, wherein the unique attributes include attributes that are present in some but not all of the "n" data sets and/or the user specifications; determining maximum and minimum values of the common attributes; determining maximum and minimum values of the unique attributes; and outputting as the merged/blended timing constraint a timing constraint that satisfies the maximum and minimum values of the common attributes, as well as the maximum and minimum values of the unique attributes. In embodiments of the invention, the blending/merging process performed at block 522 is a modular algorithm, which allows it to easily interface with a wide variety of types (and number) of "n" data sets, as well as a wide variety of types of user specifications.

In some embodiments of the invention, the types of user specifications can include blending each rise/fall/early/late (modes and edges) of timing quantities across the "n" sets of data (shown at block 508). These blending operations can, for example, take the minimum of all early mode arrival times and the maximum of all late arrival times. In some aspects of the invention, the user specifications can include user-specific comparisons, including, for example, determining a unique percentage of each of the "n" sets of data (from block 508) to create a composite arrival time (AT). Once a merged data set is generated at block 522, selected parameters (e.g., arrival time (AT), slew, required arrival time (RAT)) are drawn from the merged/blended data set to generate the merged/blended data set (shown at block 524).

At block 524, the methodology 500 returns the blended data set generated at block 522. From block 524, the methodology 500 moves to decision block 516 and determines whether or not there are additional pins to be evaluated for the component-under-design. If the answer to the inquiry at decision block 516 is no, the methodology 500 moves to block 518 and ends. If the answer to the inquiry at decision block 516 is yes, the methodology 500 returns to block 504 and begins a new iteration of the methodology 500 for a next pin of the component-under-design.

Figure 6:
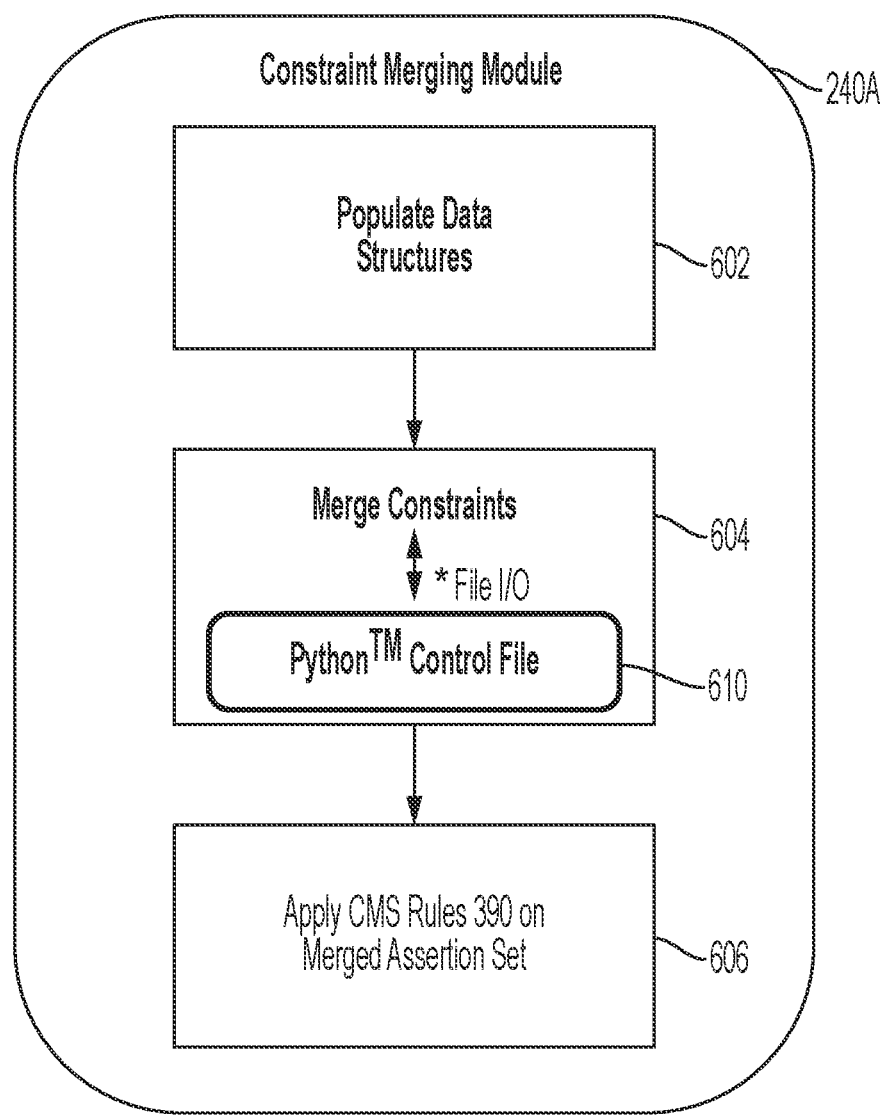
FIG. 6 depicts a block diagram illustrating a system in accordance with embodiments of the invention.

FIG. 6 depicts a block diagram illustrating an example of how the constraint merging module 240 can be implemented as a constraint merging module 240A. The constraint merging model 240A provides additional details of how operations performed by the constraint merging model 240A can be implemented. The constraint merging model 240A includes merging/blending operations that include populating data structures from 410, 420 into memory at block 602, merging constraints at block 604 (using a Python™ control file 610), and applying CMS rules 390 on a merged assertion set at block 606. In accordance with aspects of the invention, the constraint merging module 240A is configured to combine or select timing constraints in a manner that does not just considering a max/min across sets. For example, the module 240A is configured to determine if nominal timing with NIOT (noise impact on timing) is greater or less than a threshold plus/minus the nominal timing (e.g., block 510 shown in FIG. 5). If so, then this value may be used and/or compared to another timing recipe. This results in multiple and subsequent comparisons across the assertion sets (and for a specific pin) (e.g., the blending/merging analysis performed at block 522 in FIG. 5). NIOT is an STA timing model where one can model the impact of noise and how it affects the slews, arrival times, and slacks of paths due to hostile coupling from neighboring nets when they will switch within the same window as the victim net would. Accordingly, the module 240A in some embodiments of the invention implements a method (e.g., methodology 500 shown in FIG. 5 and/or methodology 700 show in FIG. 7) to allow control of assertion combing asserts by using Python™ commands. In the module 240A all of the timing constraint sets are read by the module 240A and stored in data structures. Then the module 240A passes the data structures to a Python™ routing (currently with use of json files) which performs the merging. The merged set of assertions can then be optionally run through the validation and finally written out.

Figure 7:
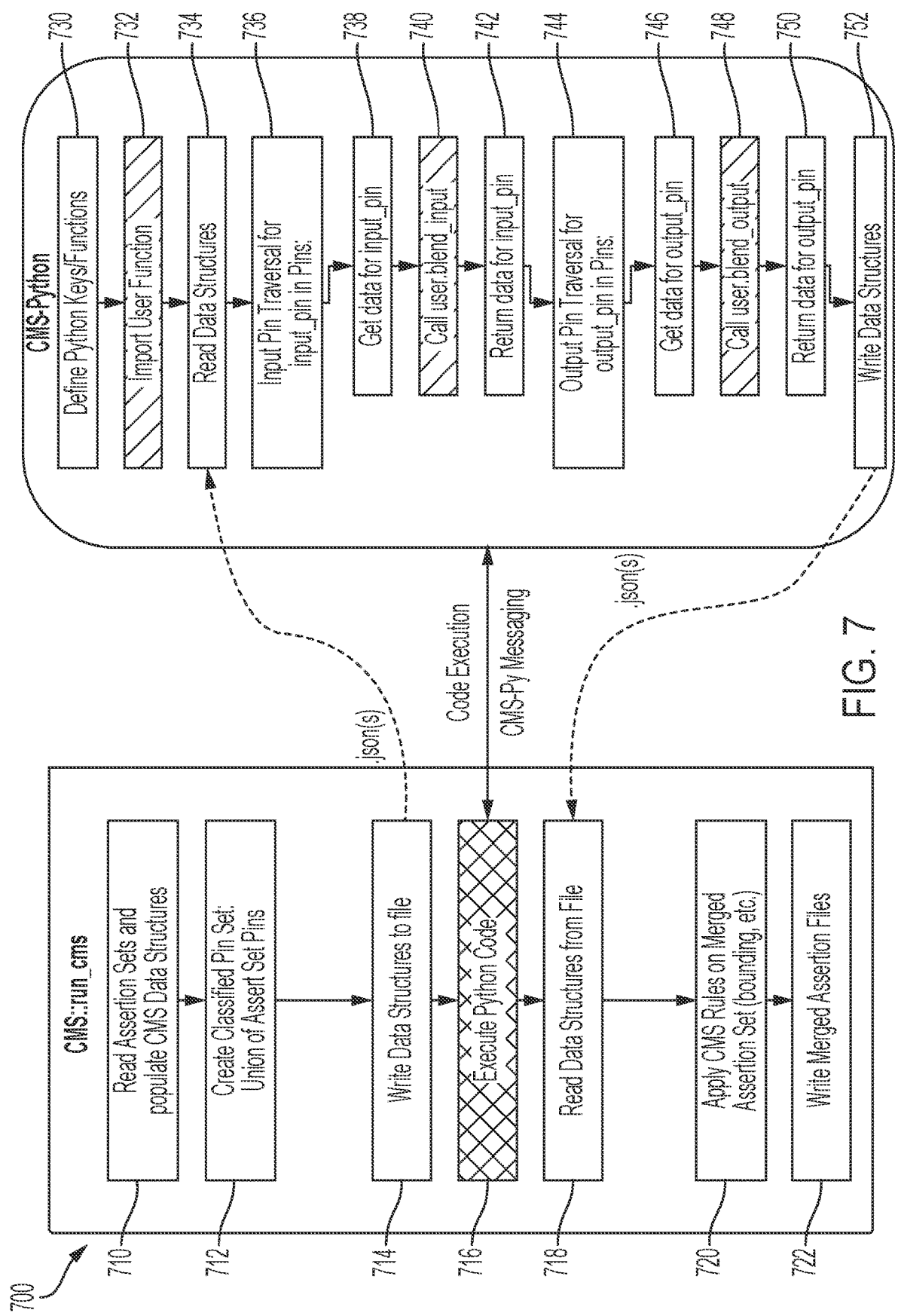
FIG. 7 depicts a flow diagram illustrating a method in accordance with embodiments of the invention.

FIG. 7 depicts a flow diagram illustrating the methodology 700 that can be performed by the module 240A in accordance with embodiments of the invention. As shown in by the methodology 700, blocks 710-722 operate in a first programing domain (e.g., C++) and blocks 730-752 operate in a second programming domain (e.g., Python™). In the methodology 700, a command is issued in the first programming domain by calling a function (e.g., CMS::run_cms) that implements blocks 710-722. At block 710, assertion/constraint sets are read, and control management system (CMS) data structures are populated into memory. At block 712, a classified pin set is created as a union of assert set pins. At block 714, data structures are written to files in the second programming domain (e.g., CMS-Python), and at block 716 a command is issued to execute the Python™ code in the second programming domain, which takes the methodology over to block 730 where Python™ keys/functions are defined. At block 732, user functions (e.g., from 210, 220, 230, 410, 420) are imported, and at block 734 the data structures from block 714 are read. At block 736, input pins are traversed using a function (input_pin), and in block 738 data for the function input_pin is accessed. At block 740, a function user.blend_input is called and executed. In accordance with embodiments of the invention, the function at block 740 is implemented using the methodology 500 (shown in FIG. 5) with a focus on the input pins of the computer-under-design. At block 742, the data that results from the function performed at block 740 is returned and blocks 744-750 are performed. Blocks 744-50 correspond to blocks 736-742 except blocks 744-750 focus on the output pins. At block 752, the results returned at blocks 742 and 750 are written to data structures and returned to block 718 in the first programming domain. In block 718, the data structures from block 752 are read. In block 720, CMS rules (e.g., CMS rules 390 shown in FIGS. 3, 4, and 6) are applied, and in block 722 the merged assertion sets are written to files. Accordingly, the methodology 700 traverses all input pins as well as output pins. During the traversal of the pins, a user specified Python™ function is called. For input pins the function is named "user.blend_input" and for output pins the function is named "user.blend_output." These two functions are passed as a Python™ data structure containing all the timing constraints for the timing constraint sets for a specific pin, and the function returns a single set of timing constraints for the pin. The user Python™ functions have full control of how to select which timing constraints to use.

To run the methodology 700, the module 240A specifies (via a "parms" command) the name of the timing constraint set and its directory and an output directory. The module 240A looks through all the input directories and loops through all possible macros. The module 240A has flexibility to continually receive updates to its merging function as its code location is specified by a parameter as well.

Figure 8:
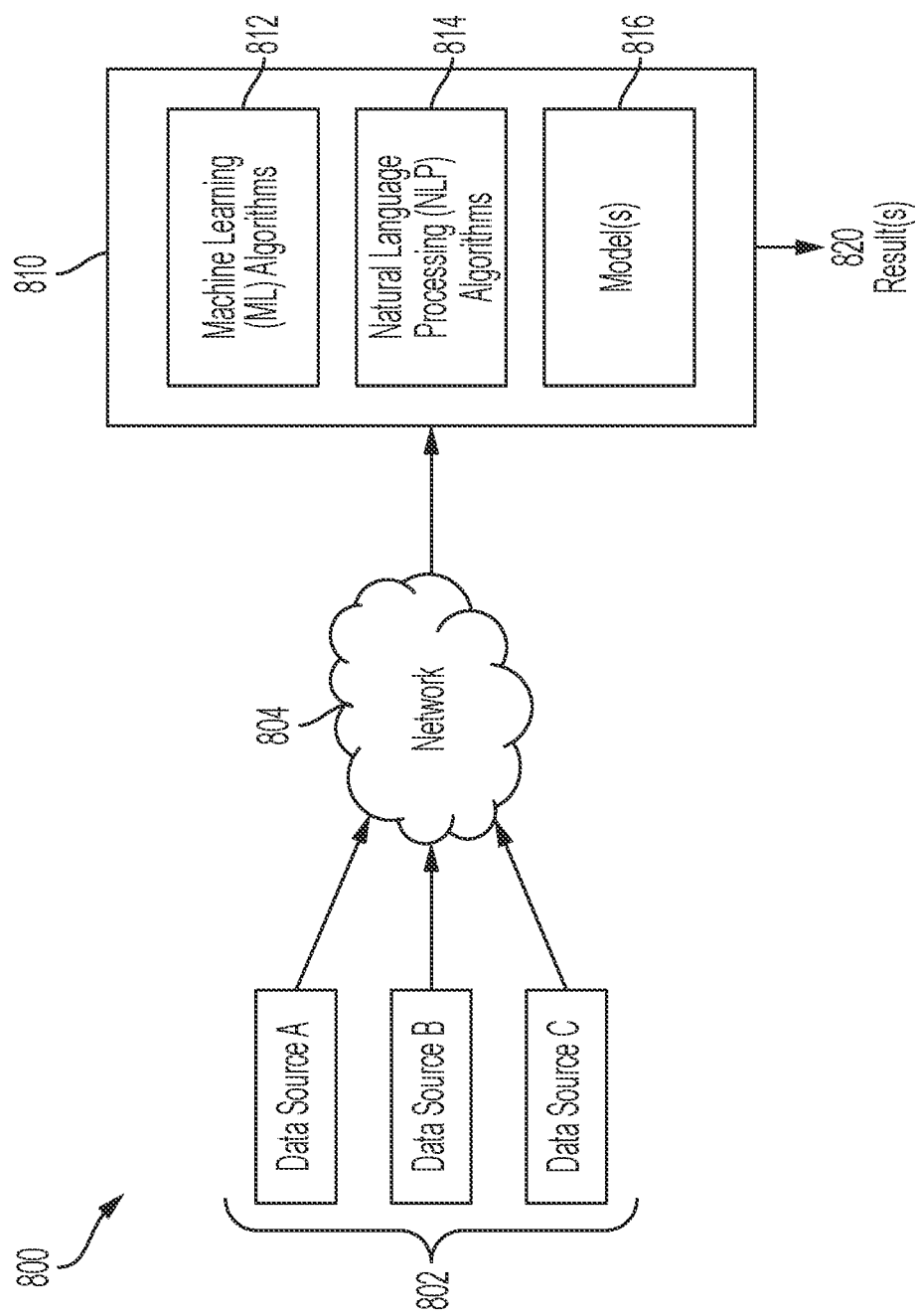
FIG. 8 depicts a machine learning system that can be utilized to implement aspects of the invention.

In some embodiments of the invention, the merging/blending determinations and predictions performed by the constraint merging module 240 (shown in FIG. 2) can be implemented as a classifier system 800, which is shown in FIG. 8. In accordance with embodiments of the invention, some or all of the functionality of the constraints merging module 240 can be performed using a classifier 810 of the classifier system 880 trained to use machine learning algorithms 812 and models 816 to perform the constraint merging operations as classification and/or prediction tasks. In some embodiments of the invention, the classifier 810 can be trained to use the multiple timing constraints 310 (shown in FIG. 4), along with (optionally) the user specification settings 420 (shown in FIG. 4) (including information about the locations and characteristics (e.g., input, output, etc.) of Pin-1, Pin-2, . . . Pin-n) to perform the task of blending or merging multiple timing constraints to recommend or predict a blended timing constraint that satisfies the multiple timing constraints. In some embodiments of the invention, the classifier 810 of the constraint merging module 240 selects one of the multiple parent-level timing constraints as the blended/merged timing constraint based on having determined that the selected parent-level timing constraint will satisfy all of the multiple parent-level timing constraints. In some embodiments of the invention, the classifier 810 of the constraint merging module 240 determines that no single parent-level timing constraint is satisfactory or optimal for satisfying the multiple parent-level timing constraints and instead determines that some type of combination of the parent-level timing constraints is appropriate. For example, where the per pin parent-level timing constraints are each a single timing value (e.g., data signal A will arrive at Pin-1 in 212 picoseconds), the classifier 810 of the constraint merging module 240 determines, recommends, and/or predicts that the single blended/merged timing constraint that will satisfy the multiple parent-level timing constraints is an average of each timing values from each of the multiple parent-level timing constraints.

Additional details of machine learning techniques that can be used to implement the functionality of the constraint merging module 240, 240A in accordance with embodiments of the invention will now be provided. In general, machine learning techniques are run on so-called "neural networks," which can be implemented as programmable computers configured to run sets of machine learning algorithms and/or natural language processing algorithms. Neural networks incorporate knowledge from a variety of disciplines, including neurophysiology, cognitive science/psychology, physics (statistical mechanics), control theory, computer science, artificial intelligence, statistics/mathematics, pattern recognition, computer vision, parallel processing, and hardware (e.g., digital/analog/VLSI/optical).

The basic function of neural networks and their machine learning algorithms is to recognize patterns by interpreting unstructured sensor data through a kind of machine perception. Unstructured real-world data in its native form (e.g., images, sound, text, or time series data) is converted to a numerical form (e.g., a vector having magnitude and direction) that can be understood and manipulated by a computer. The machine learning algorithm performs multiple iterations of learning-based analysis on the real-world data vectors until patterns (or relationships) contained in the real-world data vectors are uncovered and learned. The learned patterns/relationships function as predictive models that can be used to perform a variety of tasks, including, for example, classification (or labeling) of real-world data and clustering of real-world data. Classification tasks often depend on the use of labeled datasets to train the neural network (i.e., the model) to recognize the correlation between labels and data. This is known as supervised learning. Examples of classification tasks include identifying objects in images (e.g., stop signs, pedestrians, lane markers, etc.), recognizing gestures in video, detecting voices, detecting voices in audio, identifying particular speakers, transcribing speech into text, and the like. Clustering tasks identify similarities between objects, which they group according to those characteristics in common and which differentiate them from other groups of objects. These groups are known as "clusters."

Figure 9:
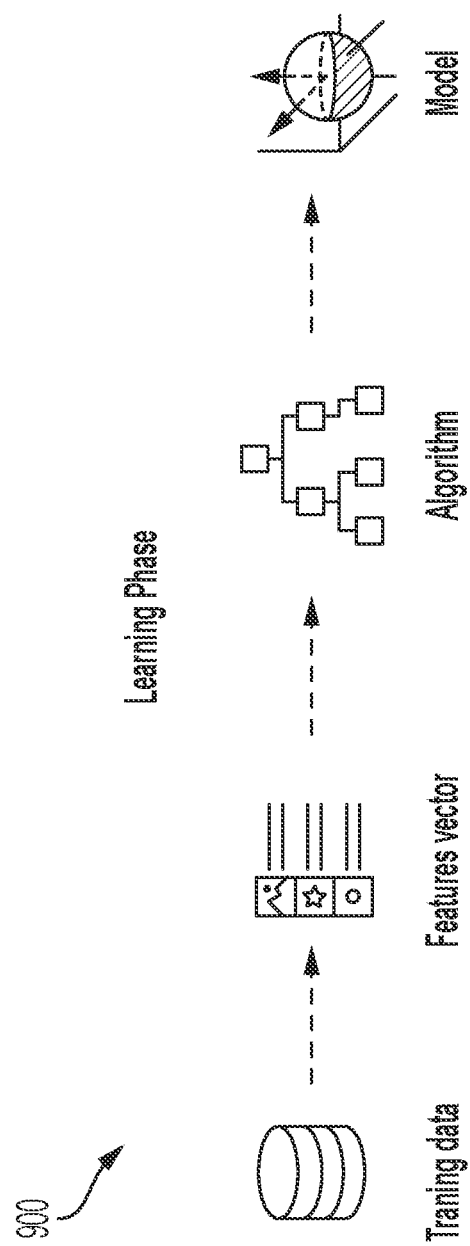
FIG. 9 depicts a learning phase that can be implemented by the machine learning system shown in FIG. 8.

An example of machine learning techniques that can be used to implement aspects of the invention will be described with reference to FIGS. 8 and 9. Machine learning models configured and arranged according to embodiments of the invention will be described with reference to FIG. 8. Detailed descriptions of an example computing system 1000 and network architecture capable of implementing one or more of the embodiments of the invention described herein will be provided with reference to FIG. 10.

FIG. 8 depicts a block diagram showing a classifier system 800 capable of implementing various aspects of the invention described herein. More specifically, the functionality of the system 800 is used in embodiments of the invention to generate various models and/or sub-models that can be used to implement computer functionality in embodiments of the invention. The system 800 includes multiple data sources 802 in communication through a network 804 with a classifier 810. In some aspects of the invention, the data sources 802 can bypass the network 804 and feed directly into the classifier 810. The data sources 802 provide data/information inputs that will be evaluated by the classifier 810 in accordance with embodiments of the invention.

The data sources 802 also provide data/information inputs that can be used by the classifier 810 to train and/or update model(s) 816 created by the classifier 810. The data sources 802 can be implemented as a wide variety of data sources, including but not limited to, sensors configured to gather real time data, data repositories (including training data repositories), and outputs from other classifiers. The network 804 can be any type of communications network, including but not limited to local networks, wide area networks, private networks, the Internet, and the like.

The classifier 810 can be implemented as algorithms executed by a programmable computer such as a processing system 1000 (shown in FIG. 10). As shown in FIG. 8, the classifier 810 includes a suite of machine learning (ML) algorithms 812; natural language processing (NLP) algorithms 814; and model(s) 816 that are relationship (or prediction) algorithms generated (or learned) by the ML algorithms 812. The algorithms 812, 814, 816 of the classifier 810 are depicted separately for ease of illustration and explanation. In embodiments of the invention, the functions performed by the various algorithms 812, 814, 816 of the classifier 810 can be distributed differently than shown. For example, where the classifier 810 is configured to perform an overall task having sub-tasks, the suite of ML algorithms 812 can be segmented such that a portion of the ML algorithms 812 executes each sub-task and a portion of the ML algorithms 812 executes the overall task. Additionally, in some embodiments of the invention, the NLP algorithms 814 can be integrated within the ML algorithms 812.

The NLP algorithms 814 include speech recognition functionality that allows the classifier 810, and more specifically the ML algorithms 812, to receive natural language data (text and audio) and apply elements of language processing, information retrieval, and machine learning to derive meaning from the natural language inputs and potentially take action based on the derived meaning. The NLP algorithms 814 used in accordance with aspects of the invention can also include speech synthesis functionality that allows the classifier 810 to translate the result(s) 820 into natural language (text and audio) to communicate aspects of the result(s) 820 as natural language communications.

The NLP and ML algorithms 814, 812 receive and evaluate input data (i.e., training data and data-under-analysis) from the data sources 802. The ML algorithms 812 include functionality that is necessary to interpret and utilize the input data's format. For example, where the data sources 802 include image data, the ML algorithms 812 can include visual recognition software configured to interpret image data. The ML algorithms 812 apply machine learning techniques to received training data (e.g., data received from one or more of the data sources 802) in order to, over time, create/train/update one or more models 816 that model the overall task and the sub-tasks that the classifier 810 is designed to complete.

Referring now to FIGS. 8 and 7 collectively, FIG. 7 depicts an example of a learning phase 700 performed by the ML algorithms 812 to generate the above-described models 816. In the learning phase 700, the classifier 810 extracts features from the training data and coverts the features to vector representations that can be recognized and analyzed by the ML algorithms 812. The features vectors are analyzed by the ML algorithm 812 to "classify" the training data against the target model (or the model's task) and uncover relationships between and among the classified training data. Examples of suitable implementations of the ML algorithms 812 include but are not limited to neural networks, support vector machines (SVMs), logistic regression, decision trees, hidden Markov Models (HMMs), etc. The learning or training performed by the ML algorithms 812 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 810 and the ML algorithms 812. Unsupervised learning can utilize additional learning/training methods including, for example, clustering, anomaly detection, neural networks, deep learning, and the like.

When the models 816 are sufficiently trained by the ML algorithms 812, the data sources 802 that generate "real world" data are accessed, and the "real world" data is applied to the models 816 to generate usable versions of the results 820. In some embodiments of the invention, the results 820 can be fed back to the classifier 810 and used by the ML algorithms 812 as additional training data for updating and/or refining the models 816.

In aspects of the invention, the ML algorithms 812 and the models 816 can be configured to apply confidence levels (CLs) to various ones of their results/determinations (including the results 820) in order to improve the overall accuracy of the particular result/determination. When the ML algorithms 812 and/or the models 816 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 810 can be configured to apply confidence levels (CLs) to the results 820. When the classifier 810 determines that a CL in the results 820 is below a predetermined threshold (TH) (i.e., CL<TH), the results 820 can be classified as sufficiently low to justify a classification of "no confidence" in the results 820. If CL>TH, the results 820 can be classified as sufficiently high to justify a determination that the results 820 are valid. Many different predetermined TH levels can be provided such that the results 820 with CL>TH can be ranked from the highest CL>TH to the lowest CL>TH.

The functions performed by the classifier 810, and more specifically by the ML algorithm 812, can be organized as a weighted directed graph, wherein the nodes are artificial neurons (e.g. modeled after neurons of the human brain), and wherein weighted directed edges connect the nodes. The directed graph of the classifier 810 can be organized such that certain nodes form input layer nodes, certain nodes form hidden layer nodes, and certain nodes form output layer nodes. The input layer nodes couple to the hidden layer nodes, which couple to the output layer nodes. Each node is connected to every node in the adjacent layer by connection pathways, which can be depicted as directional arrows that each has a connection strength. Multiple input layers, multiple hidden layers, and multiple output layers can be provided. When multiple hidden layers are provided, the classifier 810 can perform unsupervised deep-learning for executing the assigned task(s) of the classifier 810.

Similar to the functionality of a human brain, each input layer node receives inputs with no connection strength adjustments and no node summations. Each hidden layer node receives its inputs from all input layer nodes according to the connection strengths associated with the relevant connection pathways. A similar connection strength multiplication and node summation is performed for the hidden layer nodes and the output layer nodes.

The weighted directed graph of the classifier 810 processes data records (e.g., outputs from the data sources 802) one at a time, and it "learns" by comparing an initially arbitrary classification of the record with the known actual classification of the record. Using a training methodology knows as "back-propagation" (i.e., "backward propagation of errors"), the errors from the initial classification of the first record are fed back into the weighted directed graphs of the classifier 810 and used to modify the weighted directed graph's weighted connections the second time around, and this feedback process continues for many iterations. In the training phase of a weighted directed graph of the classifier 810, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the weighted directed graph's calculated values for the output nodes to these "correct" values, and to calculate an error term for each node (i.e., the "delta" rule). These error terms are then used to adjust the weights in the hidden layers so that in the next iteration the output values will be closer to the "correct" values.

FIG. 10 illustrates an example of a computer system 1000 that can be used to implement any of the computer-based components of the various embodiments of the invention described herein. The computer system 1000 includes an exemplary computing device ("computer") 1002 configured for performing various aspects of the content-based semantic monitoring operations described herein in accordance aspects of the invention. In addition to computer 1002, exemplary computer system 1000 includes network 1014, which connects computer 1002 to additional systems (not depicted) and can include one or more wide area networks (WANs) and/or local area networks (LANs) such as the Internet, intranet(s), and/or wireless communication network(s). Computer 1002 and additional system are in communication via network 1014, e.g., to communicate data between them.

Exemplary computer 1002 includes processor cores 1004, main memory ("memory") 1010, and input/output component(s) 1012, which are in communication via bus 1003. Processor cores 1004 includes cache memory ("cache") 1006 and controls 1008, which include branch prediction structures and associated search, hit, detect, and update logic, which will be described in more detail below. Cache 1006 can include multiple cache levels (not depicted) that are on or off-chip from processor 1004. Memory 1010 can include various data stored therein, e.g., instructions, software, routines, etc., which, e.g., can be transferred to/from cache 1006 by controls 1008 for execution by processor 1004. Input/output component(s) 1012 can include one or more components that facilitate local and/or remote input/output operations to/from computer 1002, such as a display, keyboard, modem, network adapter, etc. (not depicted).

Figure 11:
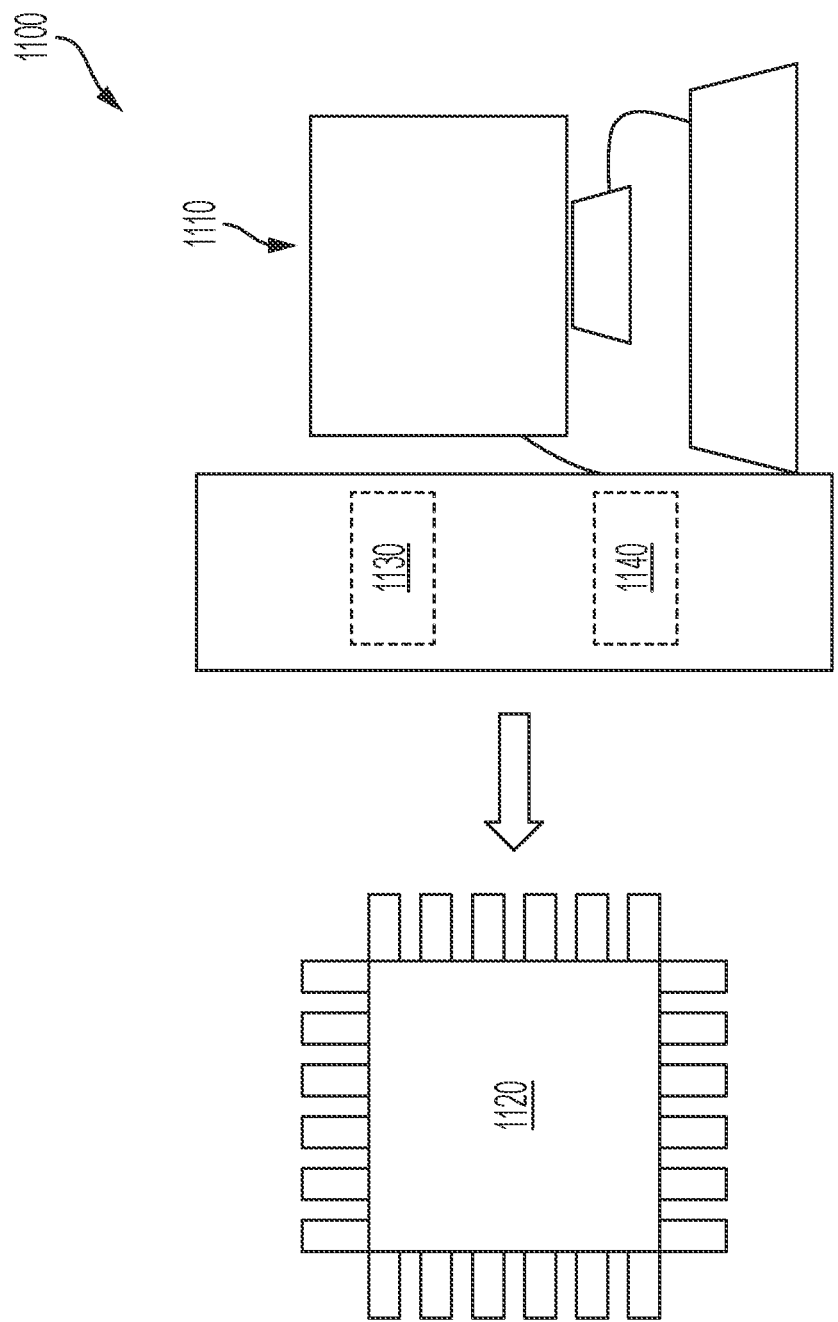
FIG. 11 depicts a block diagram of a system capable of implementing embodiments of the invention.

FIG. 11 is a block diagram of a system 1100 to perform low-latency HSS operations according to embodiments of the invention. The system 1100 includes processing circuitry 1110 used to generate the design that is ultimately fabricated into an integrated circuit 1120. The steps involved in the fabrication of the integrated circuit 1120 are well-known and briefly described herein. Once the physical layout is finalized, based, in part, on the low-latency HSS operations according to embodiments of the invention to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 12.

Figure 12:
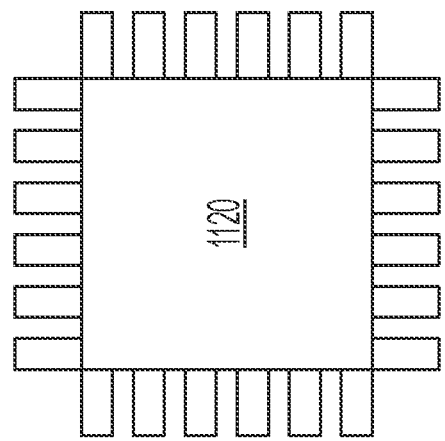
FIG. 12 is a process flow of a method of fabricating an integrated circuit capable of implementing embodiments of the invention.
Figure 12:
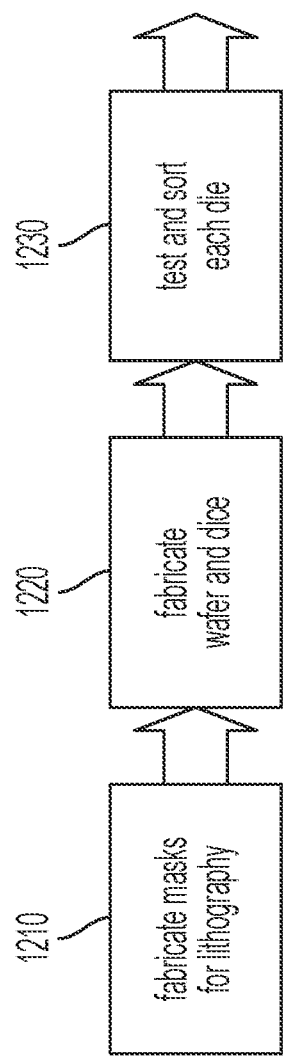

FIG. 12 is a process flow of a method of fabricating the integrated circuit according to exemplary embodiments of the invention. Once the physical design data is obtained, based, in part, on the low-latency HSS in accordance with embodiments of the invention, the integrated circuit 1120 can be fabricated according to known processes that are generally described with reference to FIG. 12. Generally, a wafer with multiple copies of the final design is fabricated and cut (i.e., diced) such that each die is one copy of the integrated circuit 1120. At block 1210, the processes include fabricating masks for lithography based on the finalized physical layout. At block 1220, fabricating the wafer includes using the masks to perform photolithography and etching. Once the wafer is diced, testing and sorting each die is performed at block 1230, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As used herein, in the context of machine learning algorithms, the terms "input data," and variations thereof are intended to cover any type of data or other information that is received at and used by the machine learning algorithm to perform training, learning, and/or classification operations.

As used herein, in the context of machine learning algorithms, the terms "training data," and variations thereof are intended to cover any type of data or other information that is received at and used by the machine learning algorithm to perform training and/or learning operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method of analyzing timing-related design options of a first component-under-design (CUD), the computer-implemented method comprising:
    accessing, using a processor, a plurality of timing constraint requirements placed on the first CUD by one or more second CUDs;
    wherein each of the plurality of timing constraint requirements is specifically designed for the first CUD; and
    performing, using the processor, a comparative analysis of each of the plurality of timing constraint requirements to identify a single timing constraint requirement that satisfies each of the plurality of timing constraint requirements.

2. The computer-implemented method of claim 1, wherein:
    the comparative analysis to identify the single timing constraint that satisfies each of the plurality of timing constraint requirements also comprises incorporating within the comparative analysis specification settings of the first CUD; and
    the specification settings are determined by a designer of:
        the first CUD;
        the one or more second CUDs; or
        the first CUD and the one or more second CUDs.

3. The computer-implemented method of claim 1, wherein the comparative analysis comprises:
    determining common attributes of the plurality of timing constraint requirements, wherein the common attributes comprise attributes that are present in each of the plurality of timing constraint requirements;
    determining unique attributes among the plurality of timing constraint requirements, wherein the unique attributes comprise attributes that are present in some but not all of the plurality of timing constraint requirements;
    determining maximum and minimum values of the common attributes; and
    determining maximum and minimum values of the unique attributes.

4. The computer-implemented method of claim 1, wherein:
    the plurality of timing constraint requirements comprises a plurality of sets of timing constraint requirements;
    each of the plurality of sets of timing constraint requirements is associated with a unique one of a plurality of pins of the first CUD; and
    performing the comparative analysis comprises applying the comparative analysis to each one of the plurality of pins of the first CUD to identify the single timing constraint requirement for each of the plurality of sets of timing constraint requirements.

5. The computer-implemented method of claim 1 further comprising using the single timing constraint requirement to generate a timing constraint requirement rule.

6. The computer-implemented method of claim 5 further comprising providing the timing constraint requirement rule to a timing engine of a static timing analysis (STA) system.

7. The computer-implemented method of claim 6 further comprising using the timing engine to apply the timing constraint requirement rule to the first CUD.

8. A computer system for analyzing timing-related design options of a first component-under-design, the computer system comprising a memory communicatively coupled to a processor, wherein the processor is configured to perform processor operations comprising:
    accessing a plurality of timing constraint requirements configured to be placed on the first CUD by one or more second CUDs;
    wherein each of the plurality of timing constraint requirements is specifically designed for the first CUD; and
    performing a comparative analysis of each of the plurality of timing constraint requirements to identify a single timing constraint requirement that satisfies each of the plurality of timing constraint requirements.

9. The computer system of claim 8, wherein:
    the comparative analysis to identify the single timing constraint requirement that satisfies each of the plurality of timing constraint requirements also comprises incorporating within the comparative analysis specification settings of the first CUD; and the specification settings are determined by a designer of:
the first CUD;
the one or more second CUDs; or
the first CUD and the one or more second CUDs.

10. The computer system of claim 8, wherein the comparative analysis comprises:
determining common attributes of the plurality of timing constraint requirements, wherein the common attributes comprise attributes that are present in each of the plurality of timing constraint requirements;
determining unique attributes among the plurality of timing constraint requirements, wherein the unique attributes comprise attributes that are present in some but not all of the plurality of timing constraint requirements;
determining maximum and minimum values of the common attributes; and
determining maximum and minimum values of the unique attributes.

11. The computer system of claim 8, wherein:
the plurality of timing constraint requirements comprises a plurality of sets of timing constraint requirements;
each of the plurality of sets of timing constraint requirements is associated with a unique one of a plurality of pins of the first CUD; and
performing the comparative analysis comprises applying the comparative analysis to each one of the plurality of pins of the first CUD to identify the single timing constraint requirement for each of the plurality of sets of timing constraint requirements.

12. The computer system of claim 8, wherein the processor operations further comprise using the single timing constraint requirement to generate a timing constraint requirement rule.

13. The computer system of claim 12, wherein the processor operations further comprise providing the timing constraint requirement rule to a timing engine of a static timing analysis (STA) system.

14. The computer system of claim 13, wherein the processor operations further comprise using the timing engine to apply the timing constraint requirement rule to the first CUD.

15. A computer program product for analyzing timing-related design options of a first component-under-design (CUD), the computer program product comprising a computer readable program stored on a computer readable storage medium, wherein the computer readable program, when executed on the processor, causes the processor to perform processor operations comprising:
accessing a plurality of timing constraint requirements configured to be placed on the first CUD by one or more second CUDs;
wherein each of the plurality of timing constraint requirements is specifically designed for the first CUD; and
performing a comparative analysis of each of the plurality of timing constraint requirements to identify a single timing constraint requirement that satisfies each of the plurality of timing constraint requirements.

16. The computer program product of claim 15, wherein:
the comparative analysis to identify the single timing constraint requirement that satisfies each of the plurality of timing constraint requirements also comprises incorporating within the comparative analysis specification settings of the first CUD; and
the specification settings are determined by a designer of:
the first CUD;
the one or more second CUDs; or
the first CUD and the one or more second CUDs.

17. The computer program product of claim 15, wherein the comparative analysis comprises:
determining common attributes of the plurality of timing constraint requirements, wherein the common attributes comprise attributes that are present in each of the plurality of timing constraint requirements;
determining unique attributes among the plurality of timing constraint requirements, wherein the unique attributes comprise attributes that are present in some but not all of the plurality of timing constraint requirements;
determining maximum and minimum values of the common attributes; and
determining maximum and minimum values of the unique attributes.

18. The computer program product of claim 15, wherein:
the plurality of timing constraint requirements comprises a plurality of sets of timing constraint requirements;
each of the plurality of sets of timing constraint requirements is associated with a unique one of a plurality of pins of the first CUD; and
performing the comparative analysis comprises applying the comparative analysis to each one of the plurality of pins of the first CUD to identify the single timing constraint requirement for each of the plurality of sets of timing constraint requirements.

19. The computer program product of claim 15, wherein the processor operations further comprise using the single timing constraint requirement to generate a timing constraint requirement rule.

20. The computer program product of claim 19, wherein the processor operations further comprise:
providing the timing constraint requirement rule to a timing engine of a static timing analysis (STA) system; and
using the timing engine to apply the timing constraint requirement rule to the first CUD.

* * * * *